US011810039B2

(12) United States Patent
Bruno et al.

(10) Patent No.: US 11,810,039 B2
(45) Date of Patent: *Nov. 7, 2023

(54) ENTERPRISE-LEVEL SECURITY METHOD AND SYSTEM

(71) Applicant: Morgan Stanley Services Group Inc., New York, NY (US)

(72) Inventors: Robert R. Bruno, Columbia, MD (US); Luke A. Higgins, Silver Spring, MD (US)

(73) Assignee: Morgan Stanley Services Group Inc., New York, NY (US)

( * ) Notice: Subject to any disclaimer, the term of this patent is extended or adjusted under 35 U.S.C. 154(b) by 54 days.

This patent is subject to a terminal disclaimer.

(21) Appl. No.: 17/209,620

(22) Filed: Mar. 23, 2021

(65) Prior Publication Data

US 2021/0234879 A1 Jul. 29, 2021

Related U.S. Application Data

(63) Continuation of application No. 16/560,148, filed on Sep. 4, 2019, now Pat. No. 10,992,696.

(51) Int. Cl.
*H04L 9/40* (2022.01)
*G06Q 10/0635* (2023.01)

(52) U.S. Cl.
CPC ....... *G06Q 10/0635* (2013.01); *H04L 63/102* (2013.01); *H04L 63/1425* (2013.01)

(58) Field of Classification Search
CPC .............. H04L 63/1425; H04L 63/102; G06Q 10/0635
See application file for complete search history.

(56) References Cited

U.S. PATENT DOCUMENTS

| 9,202,052 | B1 * | 12/2015 | Fang ................... G06F 21/552 |
| 9,516,053 | B1 * | 12/2016 | Muddu ................ G06F 3/0484 |
| 10,019,338 | B1 * | 7/2018 | Goradia ................ H04L 63/14 |

(Continued)

FOREIGN PATENT DOCUMENTS

KR 1020170056045 A 5/2017

OTHER PUBLICATIONS

NPL Search Terms (Year: 2022).*

(Continued)

*Primary Examiner* — Syed A Zaidi
(74) *Attorney, Agent, or Firm* — WEITZMAN LAW OFFICES, LLC

(57) ABSTRACT

A method of detecting and responding to anomalous activity within a system involves generating a two-dimensional graphical image of a first dimension and a second dimension, and wherein the first dimension corresponds to a cyclical repeating interval made up of multiple bins, the graphical image having been generated such that a bin of the multiple bins, is the bin having a highest count, and the bin is scaled to the second dimension, and counts of all other bins in the interval are scaled relative to that highest count, graphically comparing the generated graphical image to an immediately preceding graphical image for similarity, and when a result of the comparison fails to satisfy a pre-specified similarity threshold, automatically triggering an appropriate anomaly detection-based follow-on action.

19 Claims, 7 Drawing Sheets

(56) References Cited

U.S. PATENT DOCUMENTS

| | | | |
|---|---|---|---|
| 2005/0210533 A1* | 9/2005 | Copeland | H04L 63/1416 726/23 |
| 2010/0067391 A1 | 3/2010 | Chang et al. | |
| 2011/0035271 A1* | 2/2011 | Weaver | G06Q 10/06 340/539.1 |
| 2011/0153236 A1 | 6/2011 | Montreuil et al. | |
| 2014/0310808 A1* | 10/2014 | Yao | G06F 21/57 726/22 |
| 2015/0332125 A1 | 11/2015 | Fink | |
| 2016/0036838 A1 | 2/2016 | Jain et al. | |
| 2016/0048681 A1 | 2/2016 | Fang et al. | |
| 2016/0099963 A1* | 4/2016 | Mahaffey | G06F 21/554 726/25 |
| 2016/0103559 A1 | 4/2016 | Maheshwari et al. | |
| 2017/0048264 A1* | 2/2017 | Chauhan | G06F 21/629 |
| 2017/0063905 A1 | 3/2017 | Muddu et al. | |
| 2017/0091320 A1* | 3/2017 | Psota | G06F 16/3337 |
| 2017/0111381 A1 | 4/2017 | Jones et al. | |
| 2019/0036952 A1 | 1/2019 | Sim et al. | |
| 2019/0130279 A1 | 5/2019 | Beggel et al. | |
| 2019/0130669 A1 | 5/2019 | Boggio | |

OTHER PUBLICATIONS

Atas, Jiri, and Josef Kittler. "Spatial and feature space clustering: Applications in image analysis." International Conference on Computer Analysis of Images and Patterns. Springer, Berlin, Heidelberg, 1995 (Year: 1995).*

Liu, Duo, et al. "Network traffic anomaly detection using adaptive density-based fuzzy clustering." 2014 IEEE 13th International Conference on Trust, Security and Privacy in Computing and Communications. IEEE, 2014 (Year: 2014).*

NPL Search Terms (Year: 2023).*

Wang, Z., et al., Image Quality Assessment: From Error Visibility to Structural Similarity, IEEE Trans. on Image Processing, vol. 13, No. 4 (2004).

"Written Opinion of the International Searching Authority" issued in PCT application PCT/US2020/047664.

Genereux, SJ., et al., Maidens: Mil-std-1553 anomaly based intrusion detection system using time-based histogram comparison, IEEE Transactions on Aerospace and Electronic Systems, vol. 56(1):276-84 (2019).

* cited by examiner

ENTERPRISE-LEVEL SECURITY METHOD AND SYSTEM

CROSS REFERENCE TO RELATED APPLICATIONS

This application is a continuation of co-pending, U.S. patent application Ser. No. 16/560,148 filed Sep. 4, 2019, the entirety of which is incorporated herein by reference.

FIELD OF THE INVENTION

This application's claims relate generally to computer security and, more particularly, to security in an enterprise scale environment.

BACKGROUND

Enterprise scale computing environments are highly complex, often involving many seemingly discrete silos of hundreds, or even many thousands, of heterogeneous computers, used by different users of various departments with varying responsibilities within the enterprise.

In cybersecurity, a big problem for an enterprise scale computing environment is the identification of anomalous behavior. One such problem involves detecting anomalous login activity, that might indicate a brute force attempt to gain access to the enterprise network or compromise of credentials that might be a precursor to some sort of malicious activity, when the diversity of user work habits differs significantly among the various groups of users. Moreover, the detection problem is magnified when users within the enterprise may not have dedicated computers on which they work. Those issues are further compounded where the enterprise is multinational, such that users in multiple countries and time zones may be collaboratively working on the same things.

Current technology for detecting anomalous login activity generally relies upon development of highly complex models, employing complex statistical analysis, or application of user or group specific rules, that are not easily scalable to the enterprise level, or readily deployable across a highly diverse enterprise, without generating large numbers of false positive alerts which are disruptive, time consuming, costly and that potentially lead to complacency of those charged with responding to such alerts.

Thus, there is an ongoing technological problem that is rooted in, and unique to, providing anomalous login detection in an enterprise computing environment due to their inherent size and complexity.

SUMMARY

Our technical solution remedies the foregoing technological problems unique to the anomalous login detection in an enterprise computing environment.

One aspect of this disclosure involves a method of detecting and responding to anomalous activity within a system. The method involves receiving pivot feature information for an aspect of the system at at least one anomaly detection unit; for a snapshot interval, generating a frequency structure interrelating a pivot feature, a binning feature and counts; using the frequency structure, generating a two-dimensional graphical image, wherein the graphical image is of a first specified dimension and a second specified dimension, and wherein first specified dimension corresponds to a cyclical repeating interval made up of multiple bins, the graphical image having been generated such that a bin of the multiple bins, is the bin having a highest count, and the bin is scaled to the specified second dimension, and wherein counts of all other bins in the interval are scaled relative to that highest count; graphically comparing the generated graphical image to an immediately preceding graphical image for similarity relative to a pre-specified similarity threshold; and when a result of the comparison fails to satisfy the pre-specified similarity threshold, automatically triggering an appropriate anomaly detection-based follow-on action.

Another aspect involves an anomalous activity detection and response method performed within an enterprise scale computing environment. The method involves receiving pivot feature information for users from software agents running on computers within the enterprise computing environment; for a snapshot interval, on a per user basis, generating a frequency structure interrelating a pivot feature, a binning feature and counts; using the frequency structure, generating a two-dimensional graphical image, wherein the graphical image is of a first dimension and a second dimension, and wherein the first dimension corresponds to a cyclical repeating interval made up of multiple bins, the graphical image having been generated such that a bin of the multiple bins having a highest count is scaled to the second dimension and counts of all other bins in the interval are scaled relative to that highest count; on a per user basis, graphically comparing the generated graphical image to an immediately preceding graphical image for similarity relative to a pre-specified similarity threshold; and when a result of the comparison fails to satisfy the pre-specified similarity threshold for any particular user, automatically triggering an anomaly detection-based follow-on action for the particular user.

Yet another aspect involves method of detecting anomalous activity within an enterprise scale computing environment using stored clusters. The method involves: a) receiving pivot feature information for users from software agents running on computers within the enterprise computing environment; b) for a snapshot interval, on a per user basis, generating a frequency structure, the frequency structure interrelating a pivot feature, a binning feature and counts; c) using the frequency structure, generating a two-dimensional graphical image, wherein the graphical image is of a first dimension in one direction and a second dimension in another direction orthogonal to the first dimension, and wherein the first dimension corresponds to a cyclical repeating interval made up of multiple bins, the graphical image having been generated such that a bin of the multiple bins having a highest count is scaled to the second dimension and counts of all other bins in the interval are scaled relative to that highest count; d) on a per user basis, graphically comparing the generated graphical image to an immediately preceding graphical image for similarity relative to a pre-specified similarity threshold; e) determining that graphical images for a set of users is stable; f) for an individual user, predicting which of multiple clusters a specific graphical image for that user falls into; g) for the individual user, calculating which of the multiple clusters the specific graphical image for that user falls into; h) comparing a result of the predicting and a result of the calculating to determine whether a predicted cluster and a calculated cluster for the specific graphical image match; and i) when the predicted cluster and the calculated cluster for the specific graphical image do not match, triggering an automatic security response.

A still further aspect involves method of detecting anomalous activity within an enterprise scale computing environment using stored clusters. The method involves: a) receiving pivot feature information; b) for a snapshot interval, generating a frequency structure interrelating a pivot feature, a binning feature and counts; c) using the frequency structure, generating a two-dimensional graphical image, wherein the graphical image is of a first dimension and a second dimension orthogonal to the first dimension, and wherein the first dimension corresponds to a cyclical repeating interval made up of multiple bins, the graphical image having been generated such that a bin of the multiple bins having a highest count is scaled to the second dimension and counts of all other bins in the interval are scaled relative to that highest count; d) graphically comparing the generated graphical image to an immediately preceding graphical image for similarity relative to a pre-specified similarity threshold; e) determining that a related set of graphical images is stable; f) an individual entity within the related set, predicting which of multiple clusters a specific graphical image for that individual entity falls into; g) for the individual entity, calculating which of the multiple clusters the specific graphical image for that entity falls into; h) comparing a result of the predicting and a result of the calculating to determine whether a predicted cluster and a calculated cluster for the specific graphical image match; and i) when the predicted cluster and the calculated cluster for the specific graphical image do not match, triggering an automatic security response.

As noted below, our technical solution advantageously also has applications beyond anomaly detection in an enterprise computing environment.

The foregoing and following outlines, rather generally, the features and technical advantages of one or more embodiments of this disclosure in order that the following detailed description may be better understood. Additional features and advantages of this disclosure will be described hereinafter, which may form the subject of the claims of this application.

BRIEF DESCRIPTION OF THE DRAWINGS

This disclosure is further described in the detailed description that follows, with reference to the drawings, in which.

DETAILED DESCRIPTION

Our technical solution addresses the foregoing problems inherent in enterprise scale anomalous login detection cybersecurity by simplifying and improving detection of anomalous login activity that is readily scalable and agnostic to both the diversity of computers, and user activity, within the enterprise computing environment thereby addressing the foregoing problems that only arise(s) in the enterprise scale computer art. Still, further, approaches described herein are particularly well suited for use within any enterprise scale environment, without regard to the nature of the enterprise's activities. However, it is to also be understood that the approaches described herein are not limited to detection of anomalous login activity. Rather, advantageously, the same or analogous approaches can more broadly be used for detection of other anomalous activity that meets the pattern stability criteria described herein.

In general, high level overview, our approach is applicable to use cases where the following generic characteristics (which will be described in detail below) exist.

1. The use case is temporal in nature;
2. The use case is expected to have stable norms when no anomaly exists;
3. There exist aspects of the use case that can be used as the pivot feature(s);
4. The nature of the use case allows for binning; and
5. The detection of an anomaly would call for performing an action in response.

Figure 1:
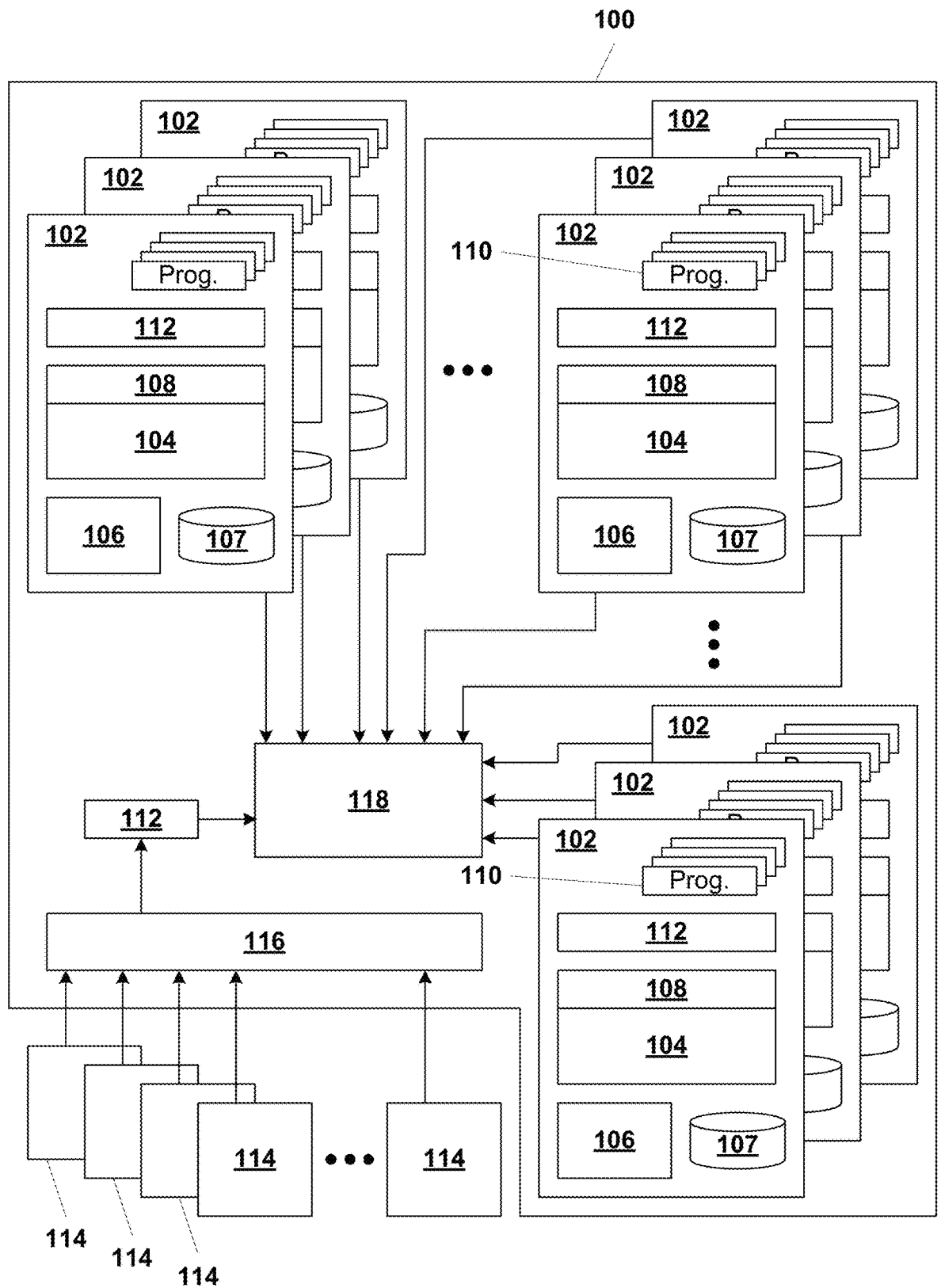
FIG. 1 illustrates, in simplified form, a representative example of an enterprise computing environment incorporating one example variant system incorporating our solution.

FIG. 1 illustrates, in simplified form, a representative example of an enterprise computing environment 100 incorporating one example variant system incorporating our solution. As shown, the enterprise computing environment 100 is made up of hundreds, if not thousands, of computers 102 through which users log in. Within the enterprise computing environment 100, each such computer 102 includes at least one processor 104, RAM 106, non-transient storage 107, at least one operating system (OS) 108, and may further include programs 110, for example any one or more of: word processors, spreadsheets, communication programs, browsers, trading programs, news programs, accounting programs, databases, company-specific or company-proprietary programs, etc. The computers 102 of the enterprise computing environment 100 can include, for example, servers, desktop computers, laptop computers, minicomputers, mainframe computers, and, in some cases, may also include mobile tablet computers, via which a user can log into the enterprise's network(s) in order to work. The computers 102 that are part of the enterprise computing environment 100 each may include at least one login agent 112 that is typically implemented, in whole or part, as software, and monitors logins via that individual computer 102 as described in greater detail below.

Alternatively, users may log in to the enterprise from computers 114 that are external to the enterprise, which may include enterprise-supplied computer devices (for example, company-provided laptops, tablet computers or smartphones) or the users' own computer devices which may be personal desktop computers, home-based servers, laptops, tablet computers or smartphones. Users of those computers 114 will access the enterprise via one or more login portal(s) 116. For remote logins, at least one login agent 112 is also coupled to the login portal and monitors logins as described herein. Finally, the enterprise computing environment 100 includes one or more anomaly detection unit(s) 118 as will be described below. However, in simplified overview, when a user logs in via a computer device 102, 114, login-related information is captured by a login agent 112 and transferred to the one or more anomaly detection unit(s) 118 for analysis and storage, in parallel with the normal, conventional, login process used to access a given part of the enterprise 102 (which, for simplicity, is not shown or described).

Figure 2:
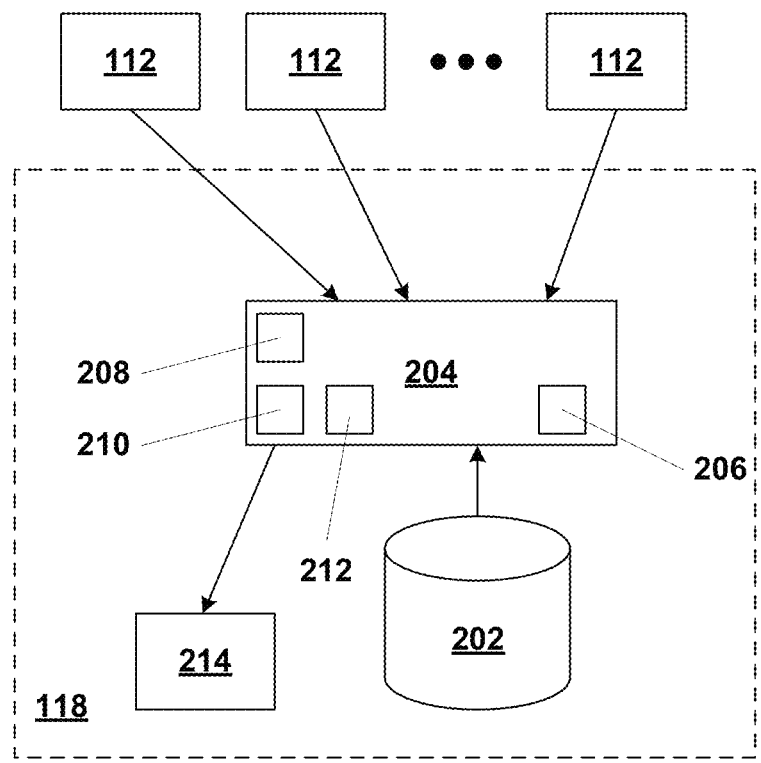
FIG. 2 illustrates, in simplified form, a more detailed view of the functional components of the anomaly detection unit(s) in context.

FIG. 2 illustrates, in simplified form, a more detailed view of the functional components of the anomaly detection unit(s) 118 in context. As shown, an anomaly detection unit is made up of non-transitory storage 202, and a login anomaly detection engine (LADE) 204. The LADE 204 is a programmed computer or multiple computers (a cluster), or part of a programmed computer, that is made up at least of one or more processors 208, memory 210 (e.g., RAM and/or ROM) containing programming and capable of storing data for use by the one or more processors 208, and I/O 212. Of course, depending upon the particular implementation, the LADE can also include or be coupled to by things like keyboards, a mouse, a display, a printer, other non-transitory storage, etc. Finally, the anomaly detection unit(s) 118 include an anomaly response unit 214, which is, or is part of, a programmed computer and, in response to a message from the LADE 204 that an anomaly has been detected, it implements rules to automatically determine what specific action(s) should be taken and send the appropriate commands (and data where appropriate) to cause those actions to occur.

The storage 202 contains stored login and image information created and used by the LADE 204. The login information can include, for example, an identifier of the user logging in, the specific machine logged into (if internal to the enterprise) or the other identifying information (e.g., IP address, device MAC address, operating system (OS), etc.), as well as timestamp information for the login. Depending upon the particular implementation, the storage 202 may be managed by, or part of, a DBMS 206 that is part of, or associated with the LADE 204. The agents 112 transfer information to the LADE 204, for processing as will be described.

In order to implement variants of our approach, certain processes may initially be performed using one or more of what we call "pivot feature(s)" and "binning feature(s)". In simplified overview, the LADE 204 uses the pivot feature(s) and binning feature(s) to generate a graphical image made up of pixels representative of a pivot feature, as pixels in one direction, and bins, based upon the binning feature(s), as pixels in the other direction. These LADE-generated images will be used for anomaly detection and clustering as described below. Thus they are features that show "normalcy" when the pivot feature is actually acting "normal" and conversely shows change when the pivot feature is no longer acting within its "norms," whatever they may be.

For simplicity of explanation and understanding, the remainder of the discussion below will be done based upon a generated image oriented according to Cartesian coordinates (i.e., an X-Y coordinate system) of a fixed number of pixels in each direction. In addition, for simplicity, the pixels along the X-axis of the LADE-generated graphical image is used for binning purposes and the pixels along the Y-axis is used for the pivot feature. However, it is to be understood that this is an arbitrary selection, and, alternatively, the Y-axis pixels could be used for binning and the X-axis pixels could be used for the pivot feature. Likewise, although it could be much more complicated, the LADE could generate images involving use of other known coordinate systems.

The pivot feature will be embodied by a "count," so it must be a feature that is countable and should have a likelihood of regular occurrences relative to the bins. A pivot feature should also be a feature where, under normal circumstances over time, the counts will not change drastically per interval. They do not need to reoccur exactly within each interval, but they should not be random, nor should they fluctuate drastically on a regular basis.

The binning feature should be a feature that repeats at some regular interval in a cyclical manner and that can "group" a subset of data for a given value of the pivot feature. The binning feature should also be one where, over multiple repeating intervals the number of unique values does not change. This is due to the need of having a constant number of "bins" over each iteration of the dataset. This feature will be categorical in nature since it is used for binning. One example of the kind of information readily suited for use as bins is temporal information. The range of bin values will form a cycle such that, once the last bin has been measured, during the next bin period, the first bin will be measured again. The length of this bin cycle is referred to generally herein as the "bin cycle length." Note here that the bins of a bin cycle need not be contiguous, in that there could be a gap between two bins, depending upon the particular implementation details. For example, with a bin cycle length of "days of the week," each bin could be one day, but, for some implementations, only weekdays may be of interest. In such a case, the regular interval could still be 24 hours, but the bins length would be 5 days (i.e., during the two days of the weekend, there would be a "pause" and nothing would be done, so following Friday, there would be two days of nothing followed by normal activity resuming on Monday). Alternatively, all seven days could be used, but there would never be a bar to scale for the weekend days.

The granularity of the bins should also be selected carefully. If the individual bins are not granular enough, the LADE will either not effectively detect anomalies or detect them in such a way that does not allow for ease of discovery of root cause. Likewise, bins that are too granular will result in unnecessary processing overhead with no gain. Therefore, it is to be understood that the granularity of the binning feature will determine the granularity of anomalies detected as well. For example, if anomalies in logins is what is to be detected and time is to be used for binning, neither using bins of a month or quarter (because they are too long and would likely require years of data before a stable image could be generated), nor using bins of a second or minute (because they are too short and the number of logins per second or minute, even for the enterprise as a whole, would likely be exceedingly small) would likely be effective, whereas daily bins or, if the enterprise works on "shifts," bins for each shift would be more effective and help reduce false positives. For example, using "day of the week" would not detect if a user logged in at odd hours of the day, but the normal amount of logins in that day, avoiding false positives if a user had to work on a time-skewed basis or unusually late. Using "hour of a day" would not detect a user logging in on an unusual day for them, if they logged in during the normal times of the day, avoiding false positives due to someone having to work on a weekend, for example, but doing so on their normal weekday schedule.

A fixed length interval is used to snapshot the pivot feature dataset into subsets and supersets. In most cases, this interval will be time based. The length is generally based on the frequency of the pivot feature data expected to be received, how long it takes for potential significant changes to be detectable, and on the specific pivot and binning features chosen. In the example of using "day of the week" this interval would naturally be 24 hours. This will create snapshots that are "N" days of data (subset) and "N+1" days of data (superset).

In further overview, each time the fixed length interval occurs, a snapshot is created where the latest dataset is added to the prior aggregate dataset. The LADE 204 creates a graphical image during each fixed length interval, representing the dataset up to the current fixed length interval. The graphical images created during the latest interval and previous interval can be compared with each other to detect anomalies.

In choosing "day of the week" as the binning feature, where each bin has a length of 24 hours, a 24 hour snapshot is used. In general, the snapshot interval should be aligned with the bin length. Depending upon the particular implementations, any multiple of the length of the bin could also be valid, but does introduce some potential side effects. For instance, whatever the chosen interval, anomalies can generally only be detected on that level of granularity, and, if selected wrong, occurrence of an anomaly may affect multiple bins. This is not necessarily undesirable for analysis of some pivot features and/or implementations, but the potential effects should be weighed in the snapshot interval selection process.

With this background, a more concrete example involving our approach follows.

First, a "pivot feature" must be chosen. This pivot feature will be used when creating data summaries. A pivot feature will be used to "group" an entire data set by unique values. In general, as noted above, the selected pivot feature should be some aspect that occurs in the dataset consistently over time, and will have values that consistently occur over multiple snapshot intervals in most cases.

Selection of the pivot feature should typically be based upon expected "normalcy" in the subsets of login data received by the LADE 204 that have the same value of this feature. The pivot feature should also be a feature that, if an instance of this feature no longer appears "normal" that may be indicative of an anomaly. One can select multiple pivot features for a given implementation, but if more than one pivot feature is desired, then, for each pivot feature, one would need to do the same steps described herein.

By way of specific example of machine login data received by the LADE 204, presume that it is made up of the following information:

User "X" (Used identifying information)—Logged into machine 102 "Y" (Machine identifying information)—at time "Z"

When looking at this data, one option for the pivot feature is the user login information, another option is the machine login information. Either or both of these pivot features could be used, but for purposes of example and simplified explanation, user login information will be used, with the understanding that the following process could be used in an analogous manner for the machine login information. Likewise, for a given implementation, an analogous process would be used for any other pivot feature.

For purposes of understanding, user login information is a good choice for a pivot feature in this example because, (1) every login event has a user, (2) in most cases, the same users will login many times over time, (3) even though individual users may come and go over time within the enterprise computing environment, the set of possible users will generally be fairly stable over time, and (4) in most cases, one expects a given user to have a "pattern of life" normalcy, meaning that people are creatures of habit, so individual users tend to work on a fairly scheduled basis, even if only self-imposed. Moreover, even though individual user activity may nominally deviate from their habit due to, for example, sickness, vacation, work travel, commuting delays, etc., we have discerned that on a macro level over time, their pattern of life will appear quite stable. Thus, from a security standpoint, if a user login activity or specific machine usage deviates "significantly" from their pattern of life this can be an indicator of an anomaly that requires action.

Once one or more pivot features are selected, the process then generates data summarizations for each pivot feature (i.e., user logins and/or machine logins). There is one summary created for each instance of the pivot feature. In the example of user logins, there would be one summary created per user, which would contain a list of records (multiple values) where each record represents one user login for that user.

The next step is choosing a binning feature which will separate the summaries into partitions based on if a given value in a summary record matches the constraints of a given bin. For example, if "day of the week" is the binning feature, for a given summary record, the timestamp field can be used to determine which "day of the week" bin that record falls into, because every record has a timestamp, and every timestamp falls within a "day of the week".

The binning feature should involve categories that all data in the summary fits into, as well as categories that will be repeatedly seen over the data in future intervals and, depending upon the particular implementation, a given binning feature might pertain to a single pivot feature, or could be used for multiple pivot features. Thus, for example, "day of the week" can be used as the binning feature for both a user pivot feature and machine pivot feature.

There will be a "count" for each bin, the count being generated by summing the number of summary records falling into each bin for each summary. In other words, User X logged in Y number of times on Z "day of the week.".

Based on the binning feature's range, a fixed interval should be chosen for taking "snapshots" of the summary, where a "snapshot" represents the summary up to that moment in time. By way of example, using "day of the week" as the binning feature, and where each bin has a range of 24 hours, a fixed snapshot interval of 24 hours (or potentially a multiple of it) would be a natural choice for the snapshot interval. Thus every 24 hours a new user login summary would be produced where summary of day N+1 (superset) is equal to summary of day N (subset) with the additional data from the new day. Of course, for example, the fixed snapshot interval could also be shorter, for example, 8 hours, to correspond with a shift change for enterprises that operate on a day/night/overnight shift basis.

Note here that these feature and interval selections are generally made first, based upon the particular enterprise and circumstances, and then implemented based upon those selections.

At this point, it should also be recognized, that the foregoing selection processes need not be performed in the order described. Rather, by their very nature, various other implementations for detection of anomalies other than anomalous logins may dictate one or more of the pivot feature(s), binning feature(s), summarizations, snapshot intervals, or counts, and it is to be recognized that any such a case is intended to be encompassed by the description herein. Once the foregoing is complete, the implementation will functionally be ready for usage.

Initially, in operation, the agents 112 collect the necessary information and provide it to the anomaly detection unit 118 for use by the LADE 204.

Using the received information, the LADE 204 will update (or create, if the first instance) daily summaries based off of each instance of the pivot feature. In the current example, this would involve updating or creating summaries based off of the user login information. The LADE 204 then calculates frequency counts using the summaries based on bins and create a frequency structure for each combination of pivot feature and count per bin. This is done for each snapshot interval (i.e., 24 hours in this example).

By way of example, for a user login pivot feature, a frequency structure is created for each user (on an individual basis), counting the number of total logins by each such user and binning these by day of the week. This structure is an array of values representing the bin a record falls into, for simplicity denoted herein as 0 thru 6, and where each instance in the array represents a single login by that user and the value of that instance represents the day of the week that login took place. For a machine login pivot feature, the same would be done for each machine (i.e., each instance in the array represents a single login by anyone using that computer 102 and the value of that instance represents the day of the week that login took place).

Using the frequency structure data, a fixed dimensions (in pixels) graphical image is created by the LADE 204. Graphical images for a given set of frequency structures (pivot feature, binning feature and count) should be of the same pixel dimensions. In other words, for each image generated, the image's length (in pixels) and width (in pixels) will remain constant. Each bin should be a fixed width in pixels (and ideally the same width from bin to bin). The width of each bin and overall width must be consistent for all images in the sequence of snapshot images. For a single image, a single "count" could be represented as 30 pixels high (as determined by the scaling method below), so a count of 7 would be represented as 210 pixels high, but the height (in pixels) for a single "count" for another image in the same sequence could be a different number of pixels as would be determined by the scaling described below.

Figure 3:
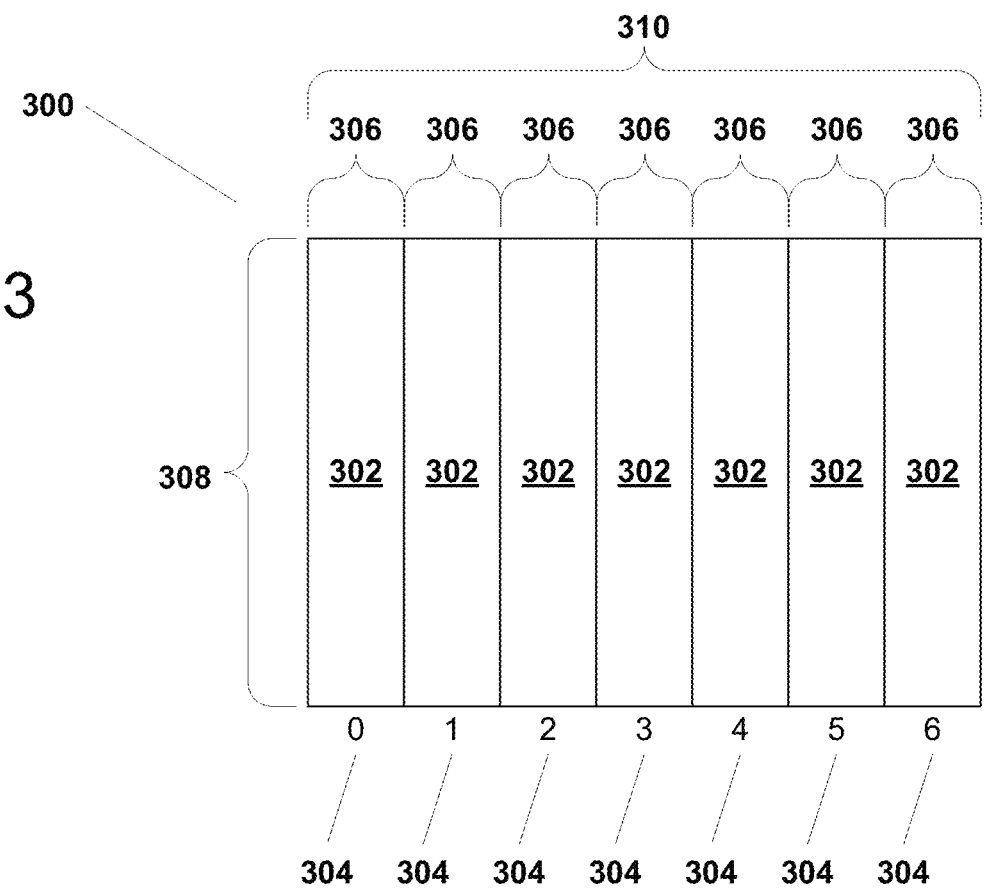
FIG. 3 illustrates, in simplified form, an example LADE-generated graphical image for a given frequency structure.

FIG. 3 illustrates, in simplified form, an example LADE-generated graphical image 300 for a given frequency structure. For purposes of the example of FIG. 3, in the graphical image 300, a bar 302 is used to represent each bin 304, and each bar is of the same width 306. The width 306 represents the fixed interval length (e.g., one day). Each bar's height 308 represents the total count for that bin. To ensure proper evaluation, whatever the order of the bins, that order must be preserved between each interval 306. The width 310 represents the length of a complete bin cycle. Note here that there is no "x" or "y" axis labeling needed.

Moreover, advantageously, the x axis has a fixed width 310 which is the sum of the widths of the bins (and in the typical case of identical width bins, the width (in pixels) of a single bin times the number of bins, and there is no fixed scale for the y axis. Rather, as will be seen below, the y axis is scaled to fit the overall image pixel height. The scaling is done by scaling to the maximum count across the bins. More specifically, the maximum count for the interval becomes the longest bar taking up the full image height, and all other bars are scaled relative to that bar.

Thus, with the user and machine pivot feature examples described above, images are created daily, for the user pivot feature, based upon the user and login count by day of week frequency structure, and for the machine pivot feature, based upon the machine, login count by day of week frequency structure.

Figure 4:
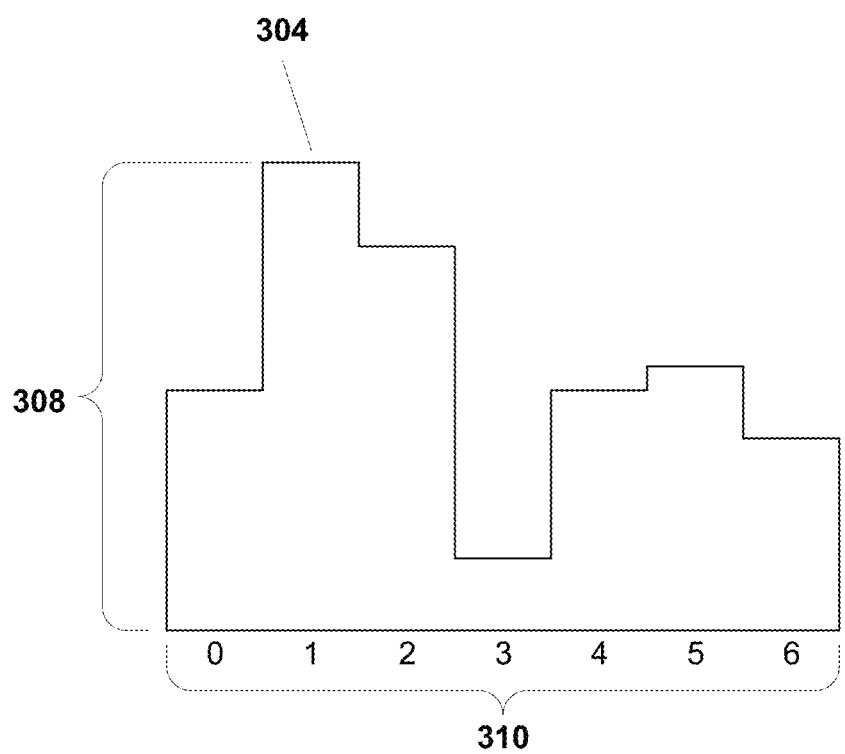
FIG. 4 illustrates, in simplified form, a representation of an example LADE generated image for user logins during a single interval.

FIG. 4 illustrates, in simplified form, a representation of an example LADE 204 generated image for user logins from a starting point, up to and including a specific 24 hour period. As noted above, the width of the bin cycle 310 (in pixels) is the sum of the individual bin widths and, as shown, the count in the second bin (bin "1" of FIG. 3) was the highest, so that count is scaled to the maximum bin height 308, and all other bins are proportionally scaled down within their respective bins. By way of a simple example, using bins for day of the week, with bin 0 being Monday and bin 6 being Sunday, and assuming that the graphical images size is a fixed 1000×2100 pixels, if the bins respectively contained counts of 8 logins (bin 0), 10 logins (bin 1), 5 logins (bin 2), 8 logins (bin 3), 5 logins (bin 4), 5 logins (bin 5) and 6 logins (bin 6), then bin 1's count of "10" is the highest and would be assigned a pixel height value of 1000, based upon that, the pixel height values for the remaining bins would respectively be scaled to 800 pixels (bin 0), 500 pixels (bin 2), 800 pixels (bin 3), 500 pixels (bin 4), 500 pixels (bin 5) and 600 pixels (bin 6). The width of each bin in this example is a fixed 300 pixels, since the total is 2100 pixels and there are 7 total bins.

In contrast, if, for the first interval, the highest bin count was 7 logins, then it would be assigned a pixel height of 1000 pixels, and the other bins would be scaled proportionally now based upon a count of 7=1000 pixels. Those counts and the generated pixel image are then stored in the non-transitory storage 202.

Next, according to our approach, for the second interval (the next 24 hour period), the count for the bin corresponding to that 24 hour period is added to the existing count and the sum is then used to generate the image. Returning to the preceding example, if the current interval is a "Tuesday" (bin 1), and the count was 10 for that interval, bin 1 the new count would be added to the prior count above (of 10), so bin 1 would become 10+10=20. Since the other bins are for other days, the other bins would not be affected for this snapshot.

Since bin 1 is still the highest, with a combined count of 20 logins, that is scaled to 1000 pixels and the others are proportionally scaled based upon that value.

The process is the same for each successive interval, i.e., the new interval count for the bin of the current snapshot interval is added to the corresponding previous sum and a snapshot image is generated by scaling the highest bin to the overall pixel height.

As should now be appreciated, after some amount of iteration over some number of intervals (which may vary depending upon the particular enterprise) image "stability" will occur. This is due to the fact that, in early intervals, the number of new counts added for an interval will be fairly close to the total number of counts for a bin, whereas, as time goes on, absent an anomaly, the new counts should not drastically change the bin count such that a meaningful difference in the image will result.

Stated another way, due to how images are being created, images need enough intervals, containing enough data, in order for the LADE 204 to generate what is considered a "stable" or "representative" graphical image for that given pivot feature count and bin feature over the repeating intervals which involves waiting until there are "enough" data points for a given pivot feature count and bin feature.

As a representative measure of stability, repetitively, differences between the two most recent graphical images can be checked. When two times the bin cycle length have been compared with no significant changes occurring, the graphical image will be considered stable. Note here that within a given enterprise, due to the diversity of users and roles, the point of stability may be different for different individual users or across different machines 102. As a more representative example, in general, with our approach and for the above example, 150 data points for a given user or machine is likely enough, and/or 2 weeks of graphical images with each pair-wise comparison having a 0.98 SSIM index or greater (as described below) is considered a good measure of stability. Notably, once image stability has been reached, it will take significant events to effect a change in the image in a meaningful way.

Once an image has reached stability, anomaly detection can begin. This is done by measuring the difference between the current interval's graphical image (superset) and one or more of the previous interval's graphical image (subset). Since stability at this point is assumed, if the measured difference exceeds, or the similarity is below, a significant threshold an anomaly has been detected. Thus, by comparing the current interval's graphical image against the immediately preceding graphical image, a specified lack of similarity would reflect an anomaly. Moreover, optionally, by comparing the current interval's graphical image against one or more earlier graphical images, a gradual shift in behavior indicative of an anomaly may be detected that might otherwise go undetected.

In general, with our approach, two graphical images are compared using an implementation of the Structural SIMilarity (SSIM) index as originated in Wang, Z., et al., Image Quality Assessment: From Error Visibility to Structural Similarity, IEEE Trans. Image Process. Vol. 13, No. 4, pp. 600-612 (2004), although other graphical image comparison approaches, for example, traditional methods such as peak signal-to-noise ratio (PSNR) and mean squared error (MSE) can be used in some implementation variants, as can newer methods such as SSIMplus (commercially available from SSIMWAVE Inc., 375 Hagey Boulevard, Suite 310, Waterloo, ON N2L 6R5) or VQM (commercially available from Moscow University via www.compression.ru/video/quality_measure/video_measurement_tool.html). For simplicity, the following is described based upon SSIM, but PSNR, MSE, SSIMplus and VQM can straightforwardly be substituted, although the thresholds may have to be adjusted for the different approaches.

In overview, the SSIM index is a value between 0 and 1, where 1 is the measure of two identical images and values that approach 0, indicate greater differences between the two images being compared. The SSIM index is highly nonlinear.

With our approach, an SSIM index of 0.90 or lower is generally considered to represent a significant anomaly for both user pivot features and machine pivot features.

Figure 5A:
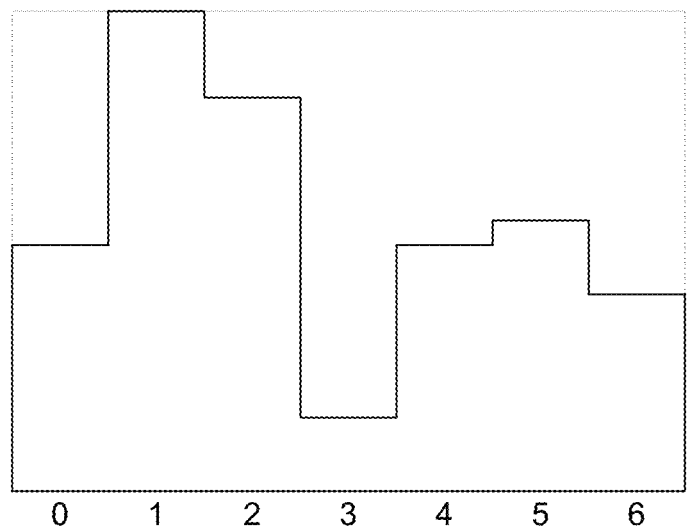
FIG. 5A illustrates, in simplified form, a representation of an example of a stable, stored, LADE-generated image for an aggregate of logins of a single user.

FIG. 5A illustrates, in simplified form, a representation of an example of a stable, stored, LADE 204 generated image for an aggregate of logins of a single user.

Figure 5B:
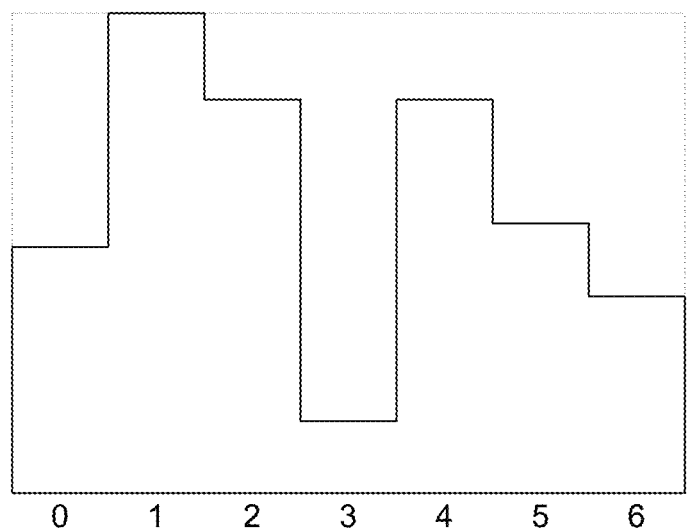
FIG. 5B illustrates, in simplified form, a representation of an example LADE-generated image for the single user of FIG. 5A on a day following the day of FIG. 5A.

FIG. 5B illustrates, in simplified form, a representation of an example LADE 204 generated image for the single user of FIG. 5A on a day following the day of FIG. 5A.

Figure 5C:
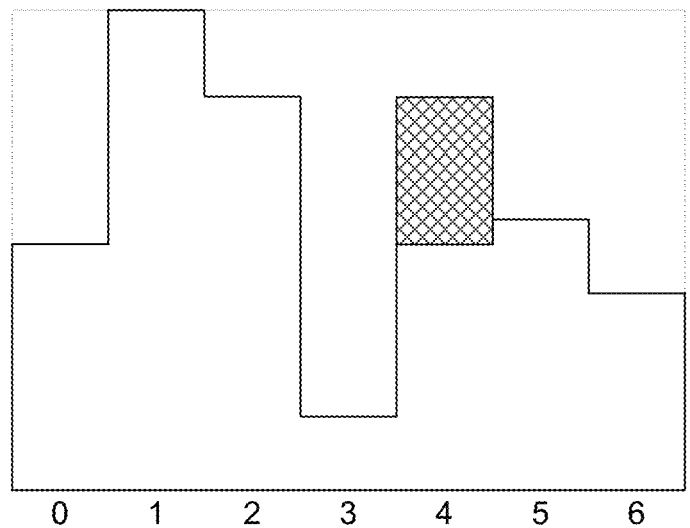
FIG. 5C illustrates, in simplified form (using cross hatching) a similarity deviation between the graphical images of FIG. 5A and FIG. 5B.

FIG. 5C illustrates, in simplified form (using cross hatching) a similarity deviation between the graphical images of FIG. 5A and FIG. 5B. As shown, an SSIM index comparing the LADE-generated image of FIG. 5B to the LADE-generated image of FIG. 5A would be less than a 0.90 threshold and, therefore, indicates detection of a significant anomaly for the bin 4 day. Moreover, at this point it is worth noting that part of the power of using this scaling approach is that the change for a given interval, if sufficiently large, will, through scaling, cause a meaningful change in the parts of the graphical image corresponding to the other bins, thereby effecting a measurable difference in the SSIM index.

As will be described below, when a significant anomaly is detected, the LADE 204 can automatically trigger various follow-on actions.

Clustering

Once created, the stable images can also be used with known clustering algorithms that allow for a custom measuring metric to be used. K-medoids, (most commonly implemented using the Partitioning Around Medoids (PAM) algorithm) is one representative example of a clustering algorithm that can be used with this data. Advantageously, due to how the LADE generates the images for the intervals, over time, there should be discernable clusters on the basis of, for example, specific departments, locations or "user roles/types".

The process for calculating clusters, at scale, involves the following steps.
  1. Choose a representative set of "stable" images for a given pivot feature, count, and binning feature.
  2. Then, pre-calculate all pairwise SSIM indices for all images in the representative set of stable images and store the calculated SSIM indices as a distance matrix.
  3. Next, analyze using K-medoids by providing the distance matrix to generate clusters with appropriate cluster size and tolerance values based on specific data set.

Advantageously, this method of clustering can also be used to detect anomalies by seeing if, in a future interval, a given instance of a pivot feature "moves" to a different cluster.

Anomaly Response

Once an anomaly is found one of numerous actions can be automatically triggered to respond to the anomaly. For example, depending upon the particular implementation, the user's account could be disabled, the particular machine 102, 114 could be quarantined from the network, a new login procedure could be imposed that requires, for example, a challenge-response protocol or other input by the user that only the user would know. If the particular machine is local and contains a camera, the camera could be turned on and facial recognition could be used to authenticate the user, or any other protocols could be triggered to enable more detailed follow-on automated analytics. Of course, along with, or instead of, any of the foregoing, an alert could be sent to the relevant personnel to investigate.

Implementation Details

Based upon the foregoing, a specific, detailed, real world, example of the processes of data collection, data summarization, frequency structure/graphical image creation, graphical image comparison, and anomaly detection, will now be described with reference to an example using counts of machine logins and users as the selected pivot feature in an enterprise environment made up of many network servers running the Linux operating system. IT personnel of ordinary skill in the art will recognize that any operating system(s) may be present in the particular enterprise, for example. the enterprise may include machines 102, 114 and servers running the Linux operating system and/or one or more other operating systems (e.g., Windows, OSX, iOS, UNIX, etc.). Although the following description is provided with reference to the Linux operating system, those of ordinary skill in the art will be able to apply the following description for implementations involving other operating systems if necessary.

Step1—Data collection

Linux servers, by default, log ssh login events in "auth" logs. These auth logs are in a raw text format where each line has information about a specific login related event, including, for example, login attempts (successful or failure), beginning of successful logins, ending of successful logins. These logs are independently populated on each Linux server in the network. Thus to see all logins for a given user, all auth logs from every server are collected by the agents 112. Depending upon the particular implementation, log collection occurs on a periodic basis, for example, when polled, or automatically asynchronously after some time, number of login attempts, or based upon occurrence of some event.

There is a syslog process running on agents 112 on or associated with each server which is used to forward various logs (one of which is the auth log) to a tcp port of a log collector, which will typically be part of the anomaly detection unit(s) 118, and coupled to or accessible by the LADE 204. Commonly available software, called Apache NiFi (available at nifi.apache.org) is an example of a centralized system that can receive the logs form the agents 112. This system parses the raw text message and normalizes various part of the raw text fields to a set of schema defined fields, for example, in the json data format. These schema compliant json formatted messages are then published to commonly available software called Apache Kafka (available at kafka.apache.org) which allows for follow on systems to consume these messages one at time in a near real time matter at scale.

The receiving platform has, for example, an Apache NiFi instance, which consumes these auth log json messages from, in this example, Apache Kafka. The receiving platform bundles them into files that contain multiple events for efficiency of storage, and, in this example for purposes of illustration, converts them to another file format, for example, the parquet file format, that allows for ease of compression and data manipulation. These bundled parquet files are then stored in the non-transitory storage 202 in a local object store which, for example, implements the Amazon Web Services S3 Application Program Interface. This enables "at scale" processing of this data in subsequent steps.

Step2—Data summarization

Since, for this example implementation, the snapshot interval is 24 hours, the LADE is configured so that a nightly job, after midnight UTC, runs a summarization task for the previous day's data. The data in the storage 202 is stored using keys that isolate the previous day's auth data from auth data from earlier days, allowing for quick retrieval of the previous day's data. The nightly job can be written in any programming language but, for purposes of this example, should be considered as written in the Python programming language. Depending upon the size of the enterprise and the amount of auth data retrieved in a day, in some implementations, the job may need to be run as a parallel job on a cluster of machines that are part of the anomaly detection unit(s) 118 or, at least associated with it or the LADE 204. If the parallel run on a cluster of machines is required, job orchestration can be performed using commonly available software such as, for example, Kubernetes (available at kubernetes.io/docs/tasks/tools/install-kubectl/). In addition, if the job is to be run as a parallel job, a distributed processing engine for building and running distributed applications can be used, for example, Ray (available at github.com/ray-project/ray).

A programmed script that creates the summaries consists of the following:

i) The main job divides the day's worth of data evenly and distributes equal portions to each machine in the cluster allowing for efficient parallelization.

ii) Each machine in the cluster reads in the portions of the data it was assigned, populates appropriate data structures, and groups these data structures, by user (pivot feature), such that each machine has organized its assigned data by user.

iii) Each machine then places the "by user" data structures back into the storage 202.

iv) The main job then looks at which users were seen in the day's worth of data by looking at the objects newly stored during "iii)", divides those users up and distributes the users evenly among the cluster.

v) Each machine in the cluster then looks to see if there is an existing summary for each user it has been assigned. If a summary already exists, the machine adds the events of that day to the summary. If the summary doesn't exist, it creates the first instance of the summary using that day's events.

As a result the summaries have taken the individual auth events and "sessionized" them so that a given session for a user is represented as one event in the summary, even though there were potentially multiple events representing it in the raw data. This allows for both effective counting of actual logins along with greatly reducing the size of the data. It also allows for things like session duration to be known.

vi) Each machine then places the updated summaries for each user seen that day into the storage 202.

Step3—Frequency Structures/Graphical Image Creation

Since bins are specified on a per day of the week (24 hour) basis, the LADE 204 creates a new image for each user every 24 hour period. This image represents the user's login activity from the first time they were ever seen in the dataset to the current day. Images from the most recent day always represents a superset of the previous day (or no change at all if no events happened that day for that user). The LADE 204 then takes the summaries in storage 202 and determines, in this example on an individual user basis, if "enough" data is present in a given summary to generate a stable image. If there is enough data, the LADE 204 creates a frequency structure for each summary, and then creates an image for that frequency structure as described above. Depending upon the makeup of the anomaly detection unit(s) 118 or LADE 204, This can also easily be parallelized as well.

An example of this process performed by the LADE 204 is as follows:

i) All summaries are listed and distributed evenly to all machines in the cluster. Even summaries that were not updated on this day are listed as well.

ii) Each machine loads, from the storage 202, each summary it has been assigned, and determines if that summary has sufficient data to generate a graphical image. For purposes of this example, presume that about 150 sessions yields sufficient data (although that number will vary with different enterprises, pivot features, and implementations). As a guide, the number can be initially selected and then later adjusted, if necessary, to help prevent early false positives due to lack of sufficient data, in this example, for a given user.

iii) For each summary that has the needed sessions, a frequency structure for that summary is created. This is done by looping through all events in the summary and creating an array in which each event is represented by a value in the array and has the value of 0 thru 6 which corresponds to the day of week (bin) that event occurred. The day of week is easily calculated since, with the software involved in this example, the "start time" of each session in the summary is guaranteed to be present.

iv) Next, for each frequency structure that is created, a corresponding image is generated by the LADE 204, for example using the "hist" function in the Python library in matplotlib based upon a fixed chosen pixel length and width, for example, 640 pixels by 490 pixels.

The method of creating the image, bearing in mind that the order of the bins must be preserved, involves:

a) Generating a bar for each bin that is of the same width as the other bars (e.g., based upon a total 490 pixel width, each bin would be 70 pixels wide).

b) Each bar is also initially denoted as having a height equal to the total counts for that bin. Note here that, in this particular sub step, how the height of each is initially represented (e.g., 1 count=1 pixel or 1 count=17 pixels, etc.) is not material (since this merely an interim that will be scaled anyway). The only proviso is that the counts across the bins are accurately, proportionally, represented. In other words, if one bin has a count of 384 and another has a count of 192, then the initial representation of the 384 count bin (whatever it is) must be twice the initial representation of the 192 count bin.

c) Then, the bar heights are scaled to fit within the image height in pixels, based on the fixed dimensions specified for the image, by setting the maximum count as equivalent to the maximum image height pixels, in this example, resulting in a bar 640 pixels high and the bin width (70 pixels) wide. While retaining the bin order at all times, all other bars for the remaining bins are scaled accordingly relative to the maximum count bar. Note here that, as a result, irrespective of the number of counts during an interval, the bin with the highest total count will always have a bar extending the full height.

d) Finally, the newly created images are stored in the storage 202 using a key that represents the date and specific user that this image is for.

As a side note, it is to be understood that the foregoing is specified to make most efficient use of the generated image dimensions. Accordingly, it is to be understood that the scaling to full height, or establishing the bin widths such that sum of the widths of the total number of bins equals the generated image width is not required as a general matter, the identical approach would work if the highest count was scaled to ¾ or ½ the total image height, or if some arbitrarily chosen number of unused pixels are maintained as a part of a border around one or more of the sides or between bins. Thus, in any such cases, an image containing pixels that will not be used in an image should be considered, for purposes of correspondence with the description herein, as if those unused pixels are not part of the generated graphical image.

Step4—Image Comparison

In this step all graphical images for a day, for each pivot feature, generated by the LADE 204, are compared to the previous day's pivot feature images for the same user and given a score using, for example, the following method. This step can be easily parallelized if the implementation of the anomaly detection unit(s) 118 or LADE 204 involves a cluster of computers. The LADE 204 then will:

i) List all users for which an image exists in the storage 202 and distribute the users to all machines in the cluster evenly.

ii) Load the current day's graphical image into memory along with the previous day's image (if it exists). If there is no prior day's image, then this is either the first time through for the particular user and/or pivot feature (or possibly, if not the first time, then merely no stable image yet exists) and, hence, no comparison can be made.

iii) The similarity between the two images is measured using the SSIM index. For example, using commonly available software, such as, for example, the "compare_ssim" module in the scikit-image python package (available at scikit-image.org). The scikit-image package is an open-source image processing library for the Python programming language.

iv) An array of SSIM indices are stored for each user in the storage 202. If an array already exists for a user, the new SSIM index for the day is appended to the existing array and updated in the storage 202. If this is the first instance (i.e., no array yet exists) then the array is created and placed into storage with a single value.

Step5—Anomaly Detection

Continuing the presumption of this example, that the anomaly detection unit(s) 118 or LADE 204 involves a cluster of computers, in this step all of the SSIM index arrays for each user are evaluated first, for stability, and then, if stability has been achieved, the LADE 204 will check for anomalies using the following sub steps:

i) List all users that have a SSIM index array in the storage 202 and distribute the users to all machines in the cluster evenly.

ii) Iterate through the values in array and look to see that there are at least the minimum number of consecutive days/cycles (e.g., 14 days/2 cycles) having SSIM indices of at least 0.98.

a) If this threshold is not met, the associated LADE-generated images are not yet stable, so anomaly detection does not proceed (note here that, in some implementations, the stability state could be indicated with a flag, but calculating stability is fairly trivial), or b) If stability is detected, then the LADE 204 examines the last two values in the array (which represent the current day being processed and the previous day) to see if the SSIM index is below the specified threshold (in this representative example, 0.90 or lower).

iii) If the SSIM index is above the specified threshold, the LADE 204 takes no further action with respect to the particular pivot feature and user combination, whereas, if the SSIM index is below the specified threshold, then an anomaly has been detected and the LADE 204 automatically triggers one or more follow-on actions, as described below.

Step6—Clustering

In overview, clustering is generally performed using all users in the relevant population without regard to role. This will have the effect of grouping similar users together. As such, one will expect that users form the same department(s) and/or role(s) will necessarily be grouped together. However, depending upon the implementation and specific enterprise, clustering could be performed on, for example, a seemingly homogeneous group, like a department, if the activity of the population within the department is sufficiently diverse and anomaly detection among those smaller clusters may be of interest for some reason.

Stable images can also be used by the LADE 204 for clustering of the overall population of relevant users. The following steps are used to both cluster the users and find anomalies using the clustering method. In this manner, not only can the LADE 204 detect an anomaly for a user, but the LADE 204 can also detect when a user moves from one cluster to another which may provide more context about the anomaly. For example, presume that a user is in a cluster containing virtually all "financial advisors." The enterprise can verify that user is, in fact, a financial advisor—so their activity is consistent with the activities of others in that cluster. Now, at some later point, that user may wind up clustered with "financial managers." That may be a logical progression reflecting a promotion or likely role change. Again, the enterprise can readily verify that user's promotion or role change. However, if at some point in thereafter, the clustering places that user in a cluster of mainly "system administrators." This would likely be worthy of flagging as an anomaly since those job duties of a system administrator are radically different from those of financial advisors and financial managers. Stated another way, clustering can be used to indicate that "User A not only is acting differently from the users of Cluster K, where User A has normally been placed, but is now acting like users in Cluster X."

Also clusters that have few members, may themselves provide meaningful information in that they have very few things like them in the general population. For example, presume an enterprise that uses a variant of our approach with clustering and that most clusters have more than 20 individual users in them. By looking at those clusters one can get an idea of what type of job roles are represented by those clusters. But, for example, there are a few specific clusters that only have 5 or less users in them. This indicates that, for whatever reason, those users that are not like most other users. This information by itself could be indicative of anomalous circumstances because, in a large enterprise (with rare exception), one would expect each user to be similar to a significant number of other people within that enterprise. Even more concretely, using clustering, malicious actor(s) will likely not look like any other user(s) in the population because of things that they are doing that would be way outside of the norm.

Thus, it should be apparent that clustering provides further powerful advantages over our already powerful anomaly detection approach described above.

To perform clustering, the LADE 204 undertakes the following steps i) Loop through all SSIM index arrays looking for users with graphical images for relevant pivot feature(s) of interest that have become stable, as discussed above. If the relevant pivot feature(s) for a user are stable, then the LADE 204 starts at the end of the array (the most recent SSIM index) for that user and pivot feature and work backwards looking for some number of consecutive scores of 0.98 or higher (in this example, presume six days) and selects the "oldest" of those six day's worth of graphical images as the stable image to be used for that user in the analysis.

ii) Based on how many users' stable graphical images have been identified, clustering may be done based on all stable graphical images (one per user), or only a sampling of the graphical images (if the number of stable images is too large) to calculate the distance matrix in a timely manner. For example, with the use case of user logins we expect that around 10,000 graphical images is the largest number presently easily worked with computationally. If the total number was higher, the LADE 204 would randomly sample down to 10,000 images.

iii) Pre-calculate all pair-wise SSIM indices for all graphical images in the representative set of stable images (each user compared to each other user) and store the calculated SSIM indices as a distance matrix in the storage 202.

iv) Use K-medoids on the distance matrix to generate clusters with appropriate cluster size and tolerance values based on the specific data set.

v) Re-cluster from scratch using this method every interval (in this example, every week) in case of population drift.

vi) Once clustering is completed, take every first stable image (for the entire population) and predict which cluster each user would fall into. The LADE 204 uses a data structure to keep track of this, since it is more efficient to not recalculate these until the next time reclustering is done. Prediction of which cluster a graphical image falls into is based on comparing the SSIM index of the graphical image to every medoid of each cluster. Whichever cluster the graphical image is most similar to (or highest SSIM index) is the cluster that the image would belong to.

vii) Thereafter, daily, take every latest graphical image for the relevant pivot feature(s) of every stable user and determine which cluster the graphical image would be part of and determine whether that cluster is the cluster that the first stable image for that pivot feature and user fell into originally.

viii) If the cluster has not changed, then the process is complete for that pivot feature/user combination. However, if the cluster has changed, this indicates an anomaly (for that user) and the LADE 204 will automatically trigger one or more follow-on actions, typically based upon the previous cluster and the new cluster.

Step7—Follow-On actions

The anomaly detection unit(s) 118 includes a response service that exposes a RESTful API that allows for external systems to send requests for actions to be performed. A RESTful API is an application program interface that uses http requests to GET, PUT, POST and DELETE data. When an anomaly is alerted the LADE 204 triggers a message to fire to the RESTful API service of the anomaly detection unit(s) 118 to conduct an action or actions. The message contains the user and the anomaly score. The response system uses the user and each anomalous SSIM index to determine what automatic actions should be performed, for example, using a set of rules based upon, for example, the SSIM index value, the user's department, position and/or role, etc.). Depending upon the particular enterprise and implementation, the actions that can be automatically triggered may include one or more of, for example: (a) requiring alternative and/or additional information from the user at login, (b) if the particular machine 102, 114 they log in from includes a camera, for each of that user's logins capturing an image of the person logging in, (c) locking out the user's login capability if identified as coming from one or more particular machines, (d) requiring increased logging levels for that user to gather more information about their activities, (e) disabling of specific entitlements or access, (f) disabling the entire account and associated accounts, (g) alerting specific security personnel, or (h) any other action(s)

that may be appropriately specified based upon the nature of the enterprise, users, and sensitivity of the information that could be accessed.

Figure 6:
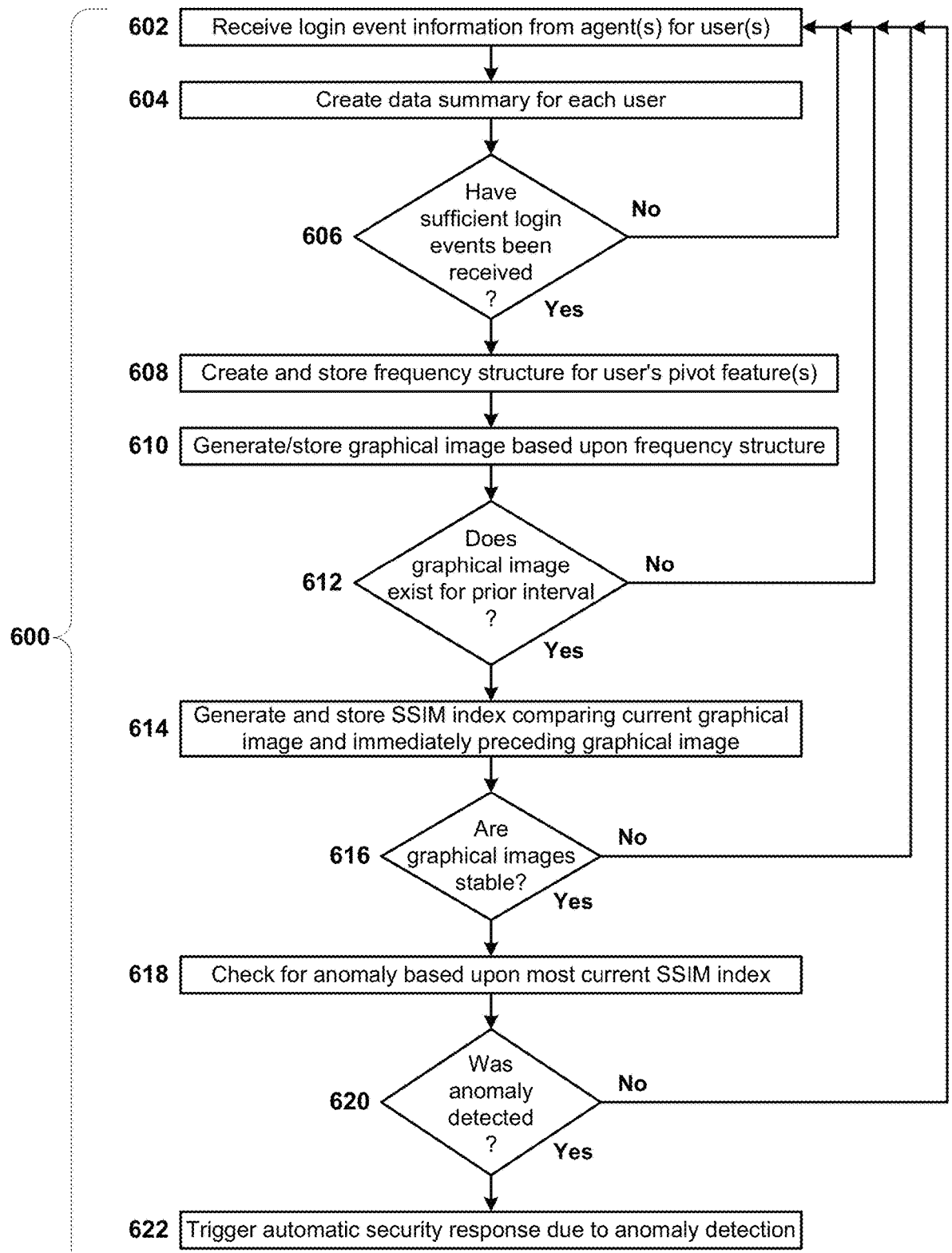
FIG. 6 is a simplified flowchart of the overall process flow for one variant anomaly detection approach performed by the anomaly detection unit(s) according to the teachings herein.

FIG. 6 is a simplified flowchart of the overall process flow 600 for one variant anomaly detection approach performed by the anomaly detection unit(s) 118 according to the teachings herein.

The process begins with the receipt of login event information from the individual agents for the users (Step 602). Using that information, data summaries are created for each user (Step 604). Then the anomaly detection unit(s) 118 check whether sufficient login events have been received for each user (Step 606). If not, the process returns to Step 602 for each user with insufficient login events. For users with sufficient login events, the anomaly detection unit(s) 118 create and store a frequency structure for each user's pivot feature(s) (Step 608) and then, based upon the frequency structure content, generates (and stores) a graphical image (Step 610). Next, the anomaly detection unit(s) 118 check whether a graphical image currently exists for the prior interval for the individual user(s). For user(s) where no graphical image currently exists for the prior interval, the process returns to Step 602. For users where a graphical image does currently exist for the prior interval, on an individual user basis, the anomaly detection unit(s) 118 generate and store an SSIM index comparing the current graphical image to the immediately preceding graphical image (Step 614).

Next, the anomaly detection unit(s) 118 check for stability of the graphical images (Step 616). Again, if the graphical images are not stable for any specific user(s), the process returns to Step 602 for such user(s). For users where the graphical images are stable, the anomaly detection unit(s) 118 check for an anomaly with each such user based upon the most current SSIM index value (Step 618). For each user where an anomaly is detected (Step 620), the an automatic security response is triggered (Step 622). For any user where an anomaly is not detected, the process returns to Step 602.

Figure 7A:
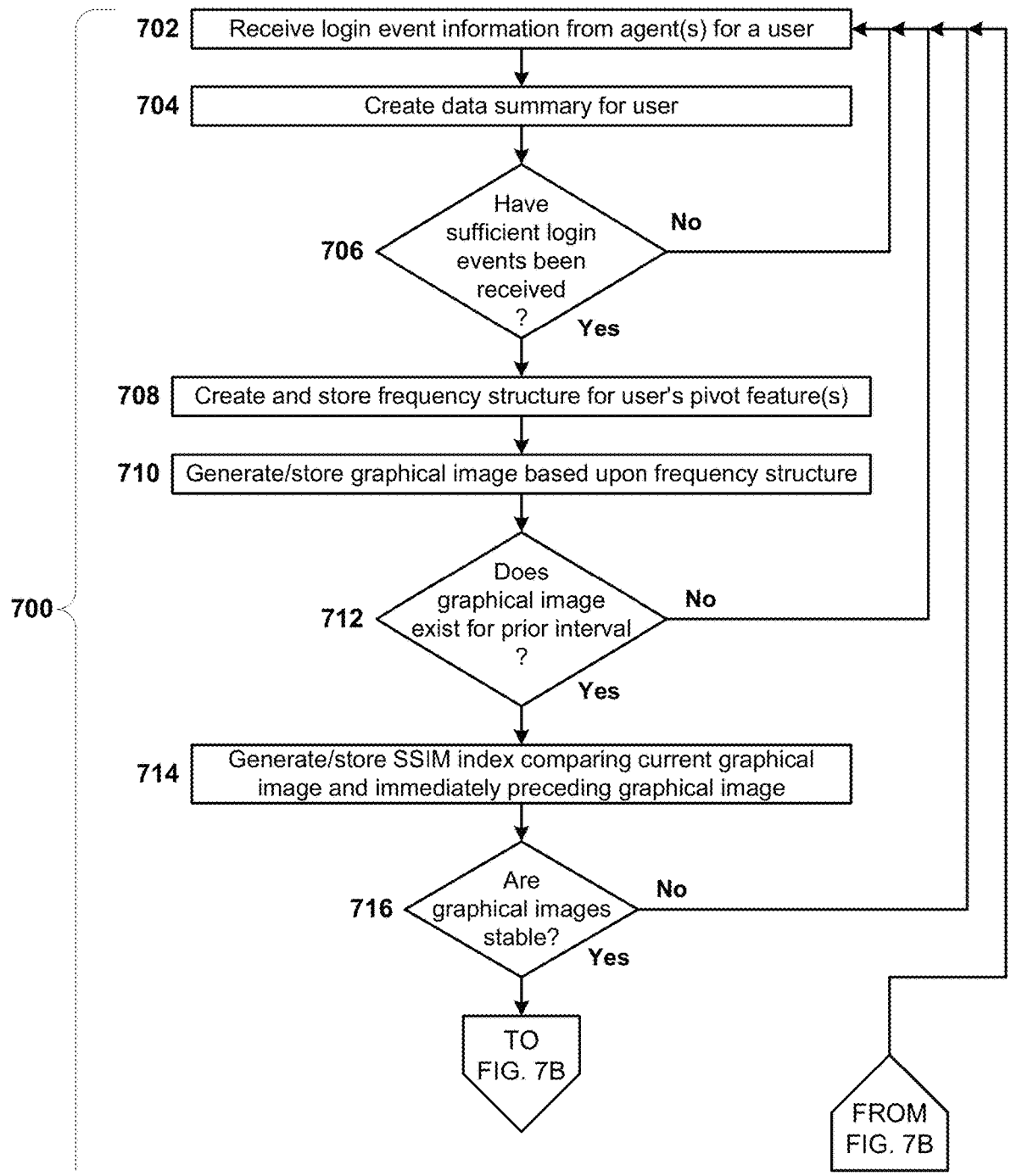
FIGS. 7A-7B are, collectively, a simplified flow chart of the overall process flow for another variant anomaly detection approach, using clustering.
Figure 7B:
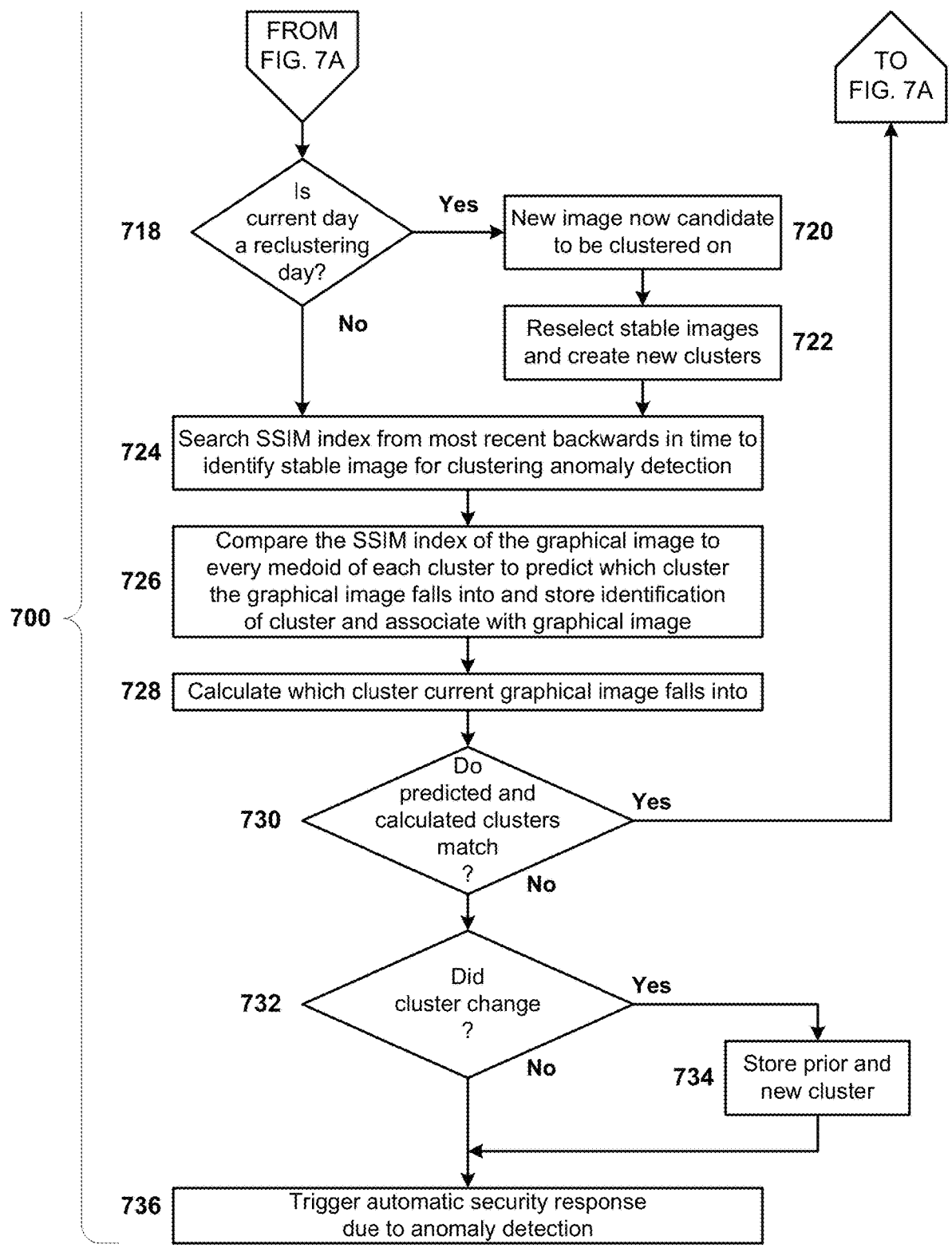

FIGS. 7A-7B are, collectively, a simplified flow chart of the overall process flow for another variant anomaly detection approach, using clustering.

As shown, Steps 702 through 716 are the same as Steps 602 through 616 described above. Then, for this process, the anomaly detection unit(s) 118 check whether the current day is a reclustering day (Step 718). If it is a reclustering day, the new (current) graphical image is used as a clustering candidate (Step 720), and the most recent stable graphical images for all relevant users are selected and used to create new clusters (Step 722).

Once Step 722 is complete, or if the current day is not a reclustering day, for each user, the anomaly detection unit(s) 118 search the SSIM index, from most recent backwards in time, to identify a stable image for use in clustering anomaly detection (Step 724).

Next, the anomaly detection unit(s) 118 compare the SSIM index of the graphical image to every medoid of each cluster to predict which cluster the graphical image falls into and stores the identification of the cluster such that it is associated with that graphical image (Step 726). In addition, the anomaly detection unit(s) 118 calculates which cluster the graphical image falls into (Step 728). Then, on a user basis, the anomaly detection unit(s) 118 compare the predicted and calculated clusters to see if they match (Step 730). If they match, then the process returns to Step 702. If they do not match for any user(s), for each such user, the anomaly detection unit(s) 118 checks whether the cluster changed (Step 732). If the cluster did change, on a user basis, the anomaly detection unit(s) 118 stores an identification of the prior and new cluster (Step 734) then, or if the cluster did not change, for each such user, the anomaly detection unit(s) 118 triggers an automatic security response.

It is to be understood that the foregoing approaches of FIG. 6 and FIG. 7A-7B are described for a single count, and bins pairing, of a pivot feature. If more than one count and bins pairing are to be used, and include the same pivot feature, the following rules should generally be followed:

All count and bins pairs must use the same interval length. For example, for the above examples, all would have to be calculated daily. In addition, Steps 606 through 620 of FIG. 6 and Steps 706 through 732 of FIGS. 7A-7B above would all need to be conducted independently for each pair. Moreover, the system should be set up to independently alert if any anomaly is identified for any pair. Finally, for some implementations, a different (typically lower) anomaly threshold could be used when dealing with multiple pairs because there may be a case where multiple factors are not quite reaching the thresholds, but having multiple "close" factors may nevertheless be indicative of an anomaly.

Other Use Cases

It should be noted the foregoing "anomaly" detection can be used in other use case applications, using the same approach, by selection of the appropriate pivot features, bins and snapshot intervals. Below are some representative illustrative example, but it should be understood that the same approach can be used for other use cases in many different fields of endeavor.

In addition to the examples above, in the cyber security realm, other representative (non-limiting) examples of pivot features that could be used include: machine logins, user web uploads or downloads, applications and number of machines they've occurred on, number of open ports by machine or user or application, application program use by user or machine, utility program use by user or machine, etc. Likewise, other examples of bins could include any logically appropriate slicing of time, such as, for example, hours of the day, months of the year, shifts of the day, business hours of the day, segments of an hour, etc. Snapshot intervals would be extensions of the above bins made up of appropriate multiples or divisors of the bins such as 24 hours, 8 hours, 1 week, 1 month, 6 minutes (tenths of an hour), shift period (however long a shift is), etc.

In the realm of fraud anomaly detection, representative (non-limiting) examples of pivot features that could be used include: user bank transactions, user credit card transactions, user credit checks, user credit scores, bank account accesses, unique internet protocol (IP) address accessing a bank account, etc. Similar temporal bins and snapshot intervals to those used for cyber security would likely be appropriate here as well, although that is not a requirement, others could be used.

Another application of the foregoing would be insider anomaly (threat) detection. To identify insider threats, representative (non-limiting) examples of pivot features that could be used include: user and print jobs, room and badge swipes, user and badge swipes, user and login times of days, user and particular storage device access, etc. Similar temporal bins and snapshot intervals to those used for cyber security would likely be appropriate here as well, although that is not a requirement, others could be used. Often, in this domain, time of day and day of week can be important due to the fact that such actions usually occur during non-peak times.

Yet another use case for the foregoing could be in quality assurance because anomalies will often point out when a system is failing or configured incorrectly, since one would expect that, for the appropriately selected pivot feature, a system operating under normal conditions will produce homogenous results, whereas a system with issues will not. Representative (non-limiting) examples of suitable pivot features for these use cases could include: number of defects per assembly, number of returns by factory or sku number, food poisoning incidents by processing plant or farm, vehicle model by user complaint or repairs, etc. Again similar temporal binning features would be applicable but in many instances larger bins with longer interval will likely be needed due to slower trends.

Our approach may also be applied to detection of "anomalies" with respect to healthcare, for example, detection of new outbreaks or starts of new illness seasons. Representative (non-limiting) examples of suitable pivot features for these use cases could include: web searches for a specific illness or symptoms (potentially over regions), reported illness per hospital or per geographic region, prescription fulfillment or over the counter medicine sales by type, etc. Again these may require larger bins such as weeks or months to see trends.

In looking at the above examples, one can see that our technique only requires that the data fit certain characteristics, not the field where it is used.

Thus, to sum up, our approaches are broadly applicable to any "anomaly" detection use case where the following characteristics exist:

1. The operation is temporal in nature.
2. The operation is expected to have stable norms when no anomaly exists.
3. There exist aspects with the qualities described above that can be used as the pivot feature(s).
4. The operation allows for binning as described (which will be the case for most temporal data).
5. The detection of an anomaly would call for performing an action in response.

Having described and illustrated the principles of this application by reference to one or more example embodiments, it should be apparent that the embodiment(s) may be modified in arrangement and detail without departing from the principles disclosed herein and that it is intended that the application be construed as including all such modifications and variations insofar as they come within the spirit and scope of the subject matter disclosed.

What is claimed is:

1. A method of detecting and responding to anomalous activity within a system comprising:
    receiving pivot feature information for an aspect of the system at at least one anomaly detection unit, wherein the pivot feature information includes at least one of logins by users, downloads by users on particular machines, or logins on particular machines, and receiving binning feature information representing a periodic temporal interval during each period of which the pivot feature information is expected to be statistically similar;
    for a snapshot interval, generating a frequency structure interrelating the pivot feature information, the binning feature information, and counts;
    using the frequency structure, generating a two-dimensional graphical image to act as a data structure storing the pivot feature information, wherein the graphical image is of a first specified dimension and a second specified dimension, and wherein the first specified dimension corresponds to the periodic temporal interval, the graphical image having been generated such that a bin of multiple bins, is the bin having a highest count, and the bin is scaled to the specified second dimension, and wherein counts of all other bins in the interval are scaled relative to that highest count;
    using an image similarity indexing algorithm to automatically compare the generated graphical image to an immediately preceding graphical image for similarity relative to a pre-specified similarity threshold; and
    when a result of the comparison fails to satisfy the pre-specified similarity threshold, automatically preventing a user from communicating using a machine that the user logged in to and thereby generated pivot feature information indicating anomalous usage, by disabling the user's account on that machine, preventing further user downloads on that machine, or requiring a second factor of authentication for further logins, thus preventing a security breach by the user.

2. The method of claim 1, wherein the pivot feature information further comprises at least one of:
    user web uploads, user web downloads, applications and number of machines they've occurred on, number of open ports by machine, number of open ports by user, number of open ports by application, specific application program use, specific utility program use, user and print jobs, room and badge swipes, user and badge swipes, user and login times of days, user and particular storage device access, number of defects per assembly, number of returns by factory or sku number, food poisoning incidents by processing plant or farm, vehicle model by user complaint or repairs, web searches for a specific illness, web searches for specific symptoms, reported illness per hospital, reported illness per geographic region, prescription fulfillment per geographic region, over the counter medicine sales by type, or over the counter medicine sales by geographic location.

3. An anomalous activity detection and response method performed within an enterprise scale computing environment, the method comprising:
    receiving pivot feature information for users from software agents running on computers within the enterprise computing environment, wherein the pivot feature information includes at least one of logins by users or logins on particular machines, and receiving binning feature information representing a periodic temporal interval during each period of which the pivot feature information is expected to be statistically similar;
    for a snapshot interval, generating a frequency structure interrelating the pivot feature information, the binning feature information, and counts;
    using the frequency structure, generating a two-dimensional graphical image to act as a data structure storing the pivot feature information, wherein the graphical image is of a first dimension and a second dimension, and wherein the first dimension corresponds to the periodic temporal interval, the graphical image having been generated such that a bin of multiple bins, is the bin having a highest count, and the bin is scaled to the second dimension, and wherein counts of all other bins in the interval are scaled relative to that highest count;
    on a per user basis, using an image similarity indexing algorithm to automatically compare the generated graphical image to an immediately preceding graphical image for similarity relative to a pre-specified similarity threshold; and
    when a result of the comparison fails to satisfy the pre-specified similarity threshold for any particular user, automatically preventing the particular user from breaching a security system by disabling at least some user account functionality, adding one or more user login steps, or photographing a user.

4. The method of claim 3, wherein the image similarity indexing algorithm comprises one of:
Structural Similarity (SSIM) index, peak signal-to-noise ratio, mean squared error, SSIMplus or VQM.

5. The method of claim 4, wherein the using an image similarity indexing algorithm comprises generating a Structural Similarity (SSIM) index and wherein the pre-specified similarity threshold is an SSIM index of 0.90 or more.

6. The method of claim 3, wherein all of the multiple bins individually have a same first dimension.

7. The method of claim 3, wherein the automatic prevention further comprises at least one of:
a) requiring alternative and/or additional information at a next login;
b) capturing a user image during a next login;
c) locking out login capability;
d) requiring increased user logging levels;
e) disabling of specific entitlements or access; or
f) disabling an account.

8. The method of claim 3, wherein:
the multiple bins cover a period that is less than the periodic temporal interval.

9. The method of claim 3, further comprising:
clustering graphical images generated for users using a clustering algorithm.

10. The method of claim 9, wherein the clustering algorithm comprises K-medoids.

11. The method of claim 3, further comprising:
determining that a user's generated graphical images are stable; and
in response to that determination, re-enabling the disabled user account functionality or removing the added one or more user login steps.

12. A method of detecting anomalous activity within an enterprise scale computing environment using stored clusters, the method comprising:
a) receiving pivot feature information for users from software agents running on computers within the enterprise computing environment, wherein the pivot feature information includes at least one of logins by users or scans of a physical badge or card by users to access a system, and receiving binning feature information representing a periodic temporal interval during each period of which the pivot feature information is expected to be statistically similar;
b) for a snapshot interval, on a per user basis, generating a frequency structure, the frequency structure interrelating the pivot feature information, the binning feature information, and counts;
c) using the frequency structure, generating a two-dimensional graphical image to act as a data structure storing the pivot feature information, wherein the graphical image is of a first dimension in one direction and a second dimension in another direction orthogonal to the first dimension, and wherein the first dimension corresponds to a the periodic temporal interval, the graphical image having been generated such that a bin of the multiple bins having a highest count is scaled to the second dimension and counts of all other bins in the interval are scaled relative to that highest count;
d) on a per user basis, using an image similarity indexing algorithm to automatically compare the generated graphical image to an immediately preceding graphical image for similarity relative to a pre-specified similarity threshold;
e) determining that graphical images for a set of users is stable;
f) for an individual user, predicting which of multiple clusters a specific graphical image for that user falls into;
g) for the individual user, calculating which of the multiple clusters the specific graphical image for that user falls into;
h) comparing a result of the predicting and a result of the calculating to determine whether a predicted cluster and a calculated cluster for the specific graphical image match; and
i) when the predicted cluster and the calculated cluster for the specific graphical image do not match, triggering an automatic security response that disables at least some user account functionality, takes a photograph of a user using the scanned physical badge or card, or adds one or more user login steps to prevent an individual user from breaching security.

13. The method of claim 12, wherein the comparing the result of the predicting and the result of the calculating further comprises:
checking whether either the predicted or the calculated cluster changed.

14. The method of claim 12, wherein the method further comprises:
determining that reclustering should be performed; and
generating and storing new clusters as the multiple clusters based upon a selected set of stable graphical images.

15. The method of claim 14, wherein the using an image similarity indexing algorithm includes generating SSIM indexes, and the method further comprises:
searching, on the per user basis, each SSIM index from most recent time backwards to identify a stable image; and
comparing individual SSIM indexes of a user's identified stable image to the stored clusters.

16. The method of claim 12, wherein the automatic security response comprises at least one of:
a) requiring alternative and/or additional information at a next login;
b) capturing a user image during a next login;
c) locking out login capability;
d) requiring increased user logging levels;
e) disabling of specific entitlements or access; or
f) disabling an account.

17. A method of detecting anomalous activity within an enterprise scale computing environment using stored clusters, the method comprising:
a) receiving pivot feature information, wherein the pivot feature information includes at least one of logins by users or logins on particular machines, and receiving binning feature information representing a periodic temporal interval during each period of which the pivot feature information is expected to be statistically similar;
b) for a snapshot interval, generating a frequency structure interrelating the pivot feature information, the binning feature information, and counts;
c) using the frequency structure, generating a two-dimensional graphical image to act as a data structure storing the pivot feature information, wherein the graphical image is of a first dimension and a second dimension orthogonal to the first dimension, and wherein the first dimension corresponds to the periodic temporal interval, the graphical image having been generated such that a bin of the multiple bins having a highest count is scaled to the second dimension and counts of all other bins in the interval are scaled relative to that highest count;

d) using an image similarity indexing algorithm to automatically compare the generated graphical image to an immediately preceding graphical image for similarity relative to a pre-specified similarity threshold;

e) determining that a related set of graphical images is stable;

f) an individual entity within the related set, predicting which of multiple clusters a specific graphical image for that individual entity falls into;

g) for the individual entity, calculating which of the multiple clusters the specific graphical image for that entity falls into;

h) comparing a result of the predicting and a result of the calculating to determine whether a predicted cluster and a calculated cluster for the specific graphical image match; and i) when the predicted cluster and the calculated cluster for the specific graphical image do not match, triggering an automatic security response that disables at least some user account functionality or adds one or more user login steps to prevent an individual user from breaching security.

18. The method of claim 17, wherein the first dimension is specified in pixels.

19. The method of claim 17, wherein the second dimension is specified in pixels.

* * * * *